United States Patent [19]

Clark

[11] Patent Number: 5,211,267
[45] Date of Patent: May 18, 1993

[54] TEMPERATURE COMPENSATED ROTARY DAMPER

[75] Inventor: Russell L. Clark, West Olive, Mich.

[73] Assignee: Prince Corporation, Holland, Mich.

[21] Appl. No.: 840,340

[22] Filed: Mar. 10, 1992

[51] Int. Cl.⁵ .......................... F16F 9/52; F16D 57/00
[52] U.S. Cl. ...................................... 188/276; 16/82; 188/290; 192/82 T
[58] Field of Search ............... 16/82; 188/276, 277, 188/290, 378; 192/82 T

[56] References Cited

U.S. PATENT DOCUMENTS

| | | | |
|---|---|---|---|
| 1,883,514 | 10/1932 | Boyer | 188/277 |
| 3,107,752 | 10/1963 | McLean | 188/276 X |
| 3,861,503 | 1/1975 | Nash | 188/276 |
| 4,098,375 | 7/1978 | Kornylak | 188/290 |
| 4,342,135 | 8/1982 | Matsuo et al. | 16/82 |
| 4,426,752 | 1/1984 | Nakayama | 16/82 |
| 4,468,836 | 9/1984 | Omata | 16/82 |
| 4,513,473 | 4/1985 | Omata | 16/82 |
| 4,527,675 | 7/1985 | Omata et al. | 188/290 |
| 4,550,470 | 11/1985 | Omata | 16/85 |
| 4,565,266 | 1/1986 | Omata | 188/322.5 |
| 4,571,773 | 2/1986 | Yuda | 16/85 |
| 4,576,252 | 5/1986 | Omata | 185/39 |
| 4,614,004 | 9/1986 | Oshida | 16/82 |
| 4,618,039 | 10/1986 | Omata | 192/4 B |
| 4,638,528 | 1/1987 | Omata | 16/82 |
| 4,653,616 | 5/1987 | Mizusawa | 188/290 |
| 4,691,811 | 9/1987 | Arakawa et al. | 188/290 |
| 4,694,530 | 9/1987 | Foggini | 16/82 |
| 4,697,673 | 10/1987 | Omata | 188/291 |
| 4,726,452 | 2/1988 | Ty et al. | 188/277 |
| 4,769,733 | 9/1988 | Nakayama | 188/291 |
| 4,773,242 | 9/1988 | Smith | 70/455 |
| 4,799,577 | 1/1989 | de Carbon | 188/277 |
| 4,830,151 | 5/1989 | Numata | 188/290 |
| 4,869,125 | 8/1989 | Saigusa | 74/574 |
| 4,893,522 | 1/1990 | Arakawa | 74/574 |
| 5,117,955 | 6/1992 | Kikuchi | 192/82 T X |

Primary Examiner—Rodney H. Bonck
Assistant Examiner—Andrea Pitts
Attorney, Agent, or Firm—Price, Heneveld, Cooper, DeWitt & Litton

[57] ABSTRACT

A temperature compensated fluid filled damper is provided which in a preferred embodiment is a rotary damper which includes a housing for receiving a rotor having a surface for engaging a viscous fluid sealed within the housing. The housing includes a temperature compensating member positioned adjacent the rotor surface and which is made of a material which has a coefficient of thermal expansion different than that of the rotor to provide a varying gap width between the surface of the rotor and the temperature compensating member such that as the temperature changes the drag provided to the rotor by the gap change varies inversely to the drag provided by the viscous fluid.

32 Claims, 3 Drawing Sheets

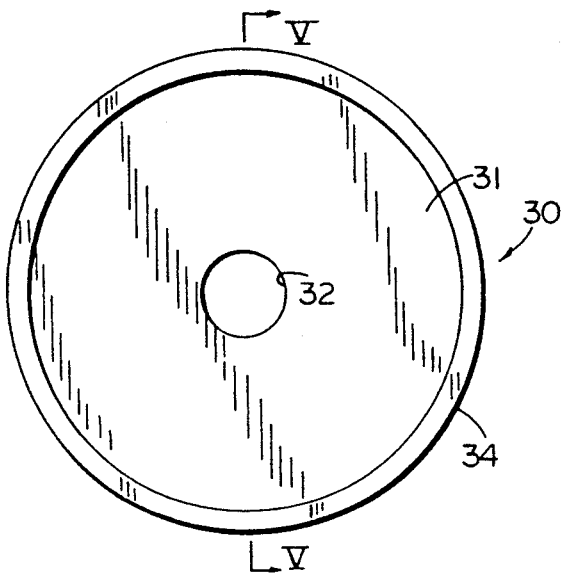
FIG. 4
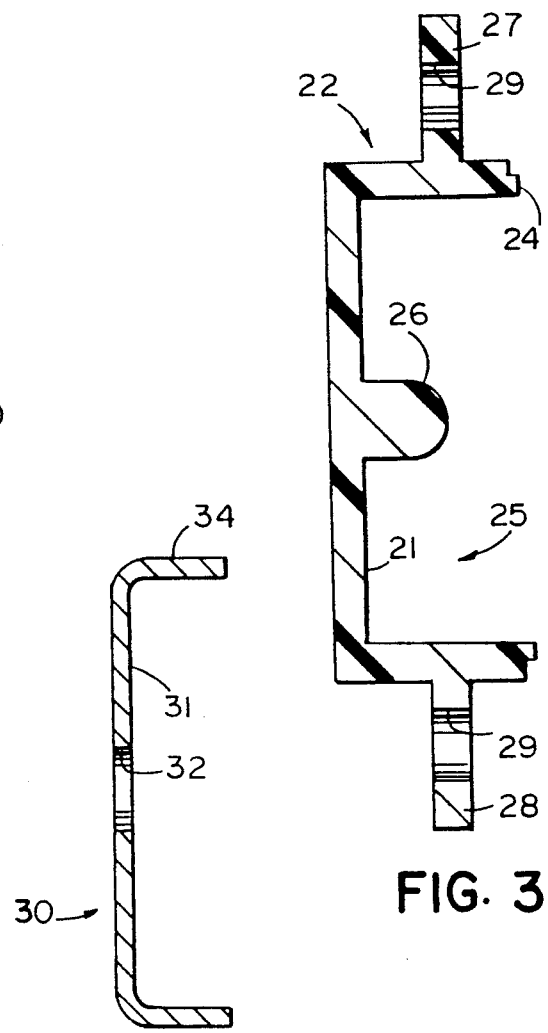
FIG. 3
FIG. 5
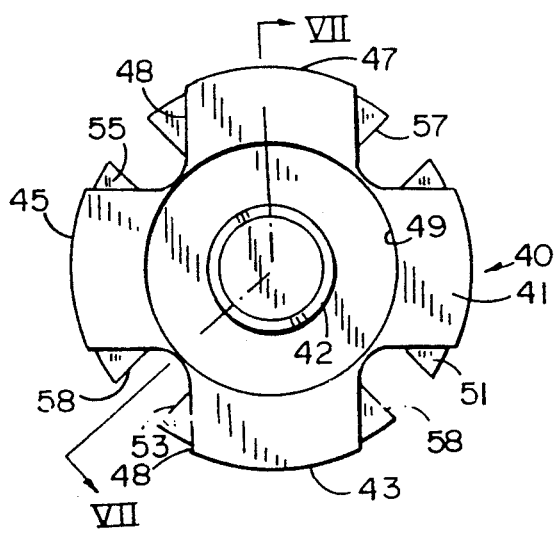
FIG. 6
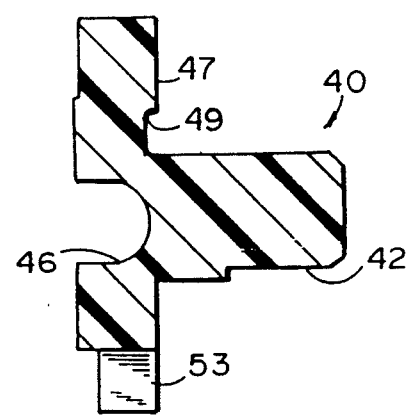
FIG. 7

5,211,267

TEMPERATURE COMPENSATED ROTARY DAMPER

BACKGROUND OF THE INVENTION

The present invention pertains to a rotary damper and particularly one which includes temperature compensation structure to control the torque for a wide range of operating temperatures.

Fluid filled viscous damping devices are becoming popular for use on a variety of vehicle accessories such as overhead storage bins, slide-out trays and the like. They allow, for example, a storage bin with a pivoted cover such as disclosed in U.S. Pat. No. 4,469,365 to be gradually lowered instead of dropping in an uncontrolled fashion. Similarly spring-loaded slides such as used in container holders or the like can also be coupled to a rotary damping device to control the slide motion as it is extended and retracted.

One difficulty with fluid filled viscous rotary damping devices is that in the vehicle environment wide temperature ranges are encountered. With a viscous fluid as the temperature decreases viscosity increases dramatically and correspondingly, as the temperature increases the viscosity decreases thereby resulting in an inconsistent feel to the vehicle accessory at different tempertures. With relatively low viscosity fluid such as lubricating oil used in internal combustion engines, multi-grade viscosity additives can be employed in an effort to control the viscosity with temperature changes. With relatively high viscosity material employed in fluid filled rotary dampers, the viscosity cannot be controlled in this manner. As a result, rotary dampers used in present vehicle accessories provide a compromised performance which varies widely with temperature fluctuations normally encountered in the vehicle environment.

SUMMARY OF THE PRESENT INVENTION

The system of the present invention provides a damper with a temperature compensating structure incorporated therein for providing a temperature dependent variable gap between two movable members which include a viscous fluid therebetween. The varying gap causes sheer forces between these elements which change with temperature variations inversely to the change of viscosity of the viscous fluid, and thus tends to maintain the effort of movement of the two members constant for wide ranges of temperatures encountered in the vehicle environment.

In a preferred embodiment, a rotary damper is provided which includes a housing for receiving a rotor having surface means for engaging a viscous fluid sealed within the housing. The housing includes a temperature compensating member positioned adjacent the rotor surface and which is made of a material which has a coefficient of thermal expansion different than that of the rotor to provide a varying gap width between the surface of the rotor and the temperature compensating member.

In a preferred embodiment of the invention, the housing is generally cup-shaped and the temperature compensation member positioned within the housing and shaped to receive the rotary paddle therein. In the preferred embodiment of the invention, the housing and rotor were made of a polymeric material while the temperature compensation member was made of a metal to provide the varying gap changes with temperature.

Such construction provides a fluid filled viscous damper which automatically controls the torque within a wide range of temperature variations and thereby provides a rotary damping device which is particularly suited for environments such as the automotive environment where wide temperature variations are normally encountered. The structure accommodates the temperature variations without providing complex moving parts and results in a highly reliable and inexpensive rotary damper with vastly improved performance. These and other features, objects and advantages of the present invention will become apparent upon reading the following description thereof together with reference to the accompanying drawings in which:

BRIEF DESCRIPTION OF THE DRAWINGS

FIG. 3 is a cross-sectional view of the housing taken along section lines III—III of FIG. 2;

FIG. 4 is an enlarged top plan view of the temperature compensating member shown in FIG. 1;

FIG. 5 is a cross-sectional view of the structure shown in FIG. 4 taken along section lines V—V of FIG. 4;

FIG. 6 is an enlarged top plan view of the rotor shown in FIG. 1;

FIG. 7 is a cross-sectional view of the rotor taken along section lines VII—VII of FIG. 6;

DETAILED DESCRIPTION OF THE PREFERRED EMBODIMENT

Figures 1, 2:
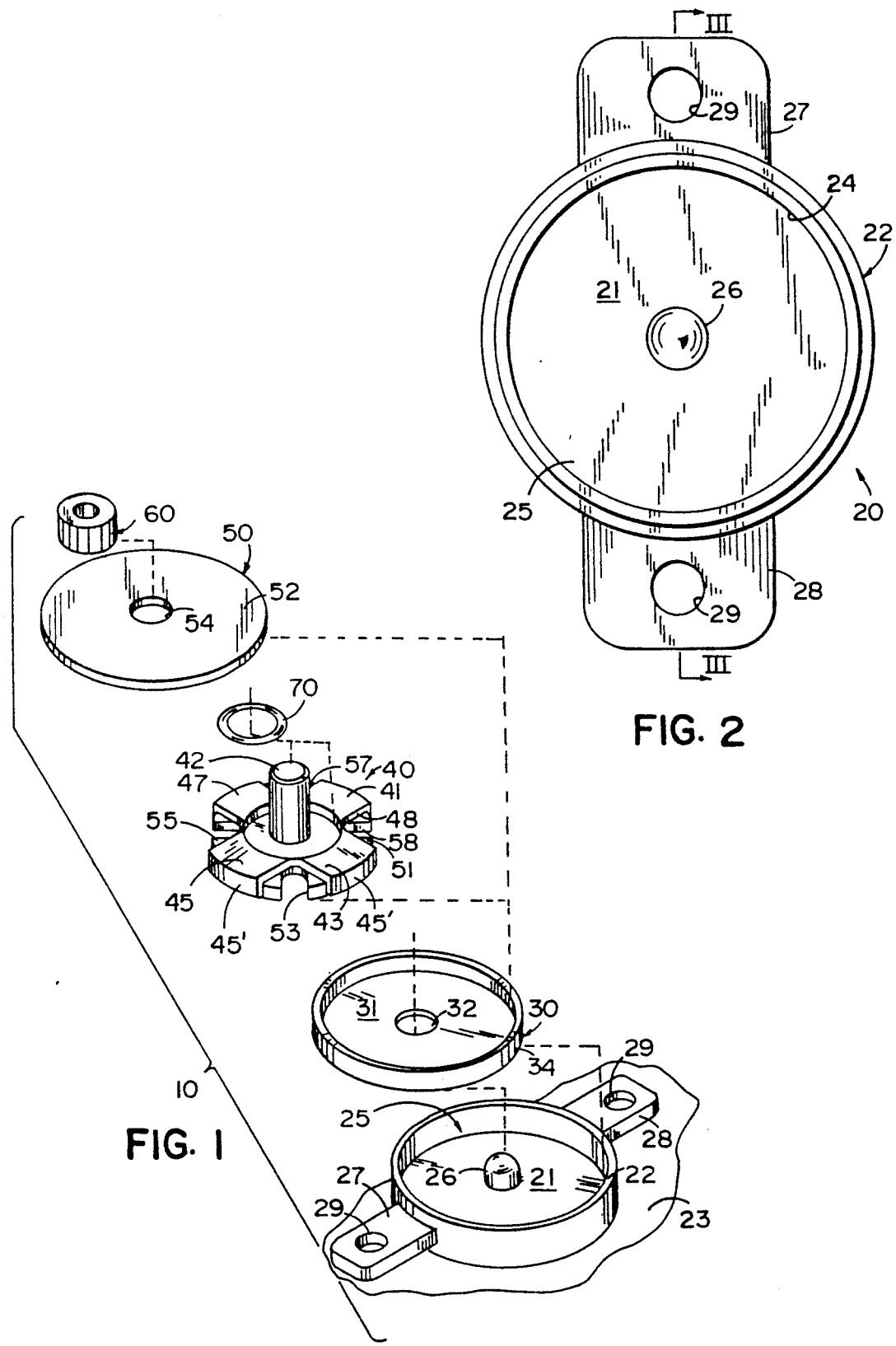
FIG. 1 is an exploded perspective view of a rotary fluid filled damper embodying the present invention.
FIG. 2 is an enlarged top plan view of the housing shown in FIG. 1.
Figure 8:
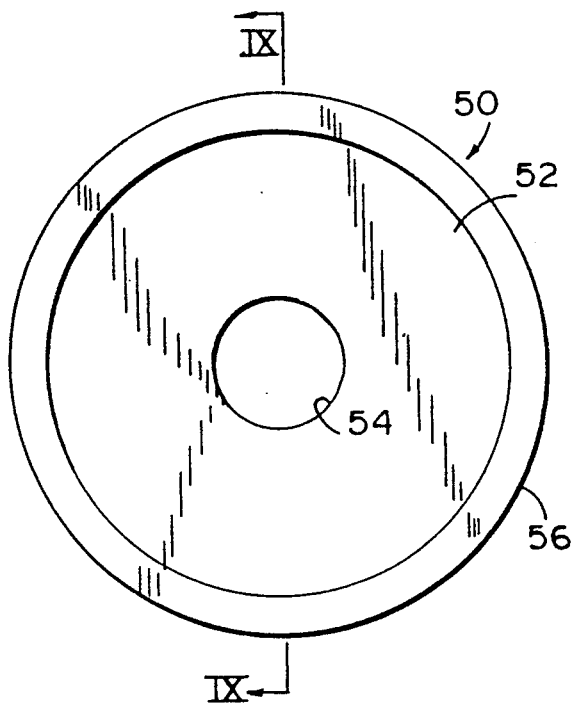
FIG. 8 is an enlarged top plan view of the cover shown in FIG. 1.
Figure 9:
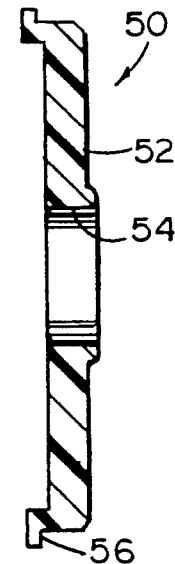
FIG. 9 is a cross-sectional view of the cover taken along section lines IX—IX of FIG. 8.

Referring initially to FIG. 1, there is shown the temperature compensated rotory fluid filled damper assembly 10 of the present invention. The damper includes a generally cup-shaped housing 20 having a circular floor 2 with an upstanding cylindrical sidewall 22 which, as best seen in FIGS. 2 and 3, includes an inner raised rim 24. The floor 21 of housing 20 also includes, as best seen in FIGS. 2 and 3, a centrally located stub axle 26 extending upwardly from floor 21 with axle 26 having a curved top which extends below the top of the cylindrical sidewall 22. Housing 20 also includes a pair of mounting tangs 27 and 28 which extend outwardly from the sidewall 22 and each include an aperture 29 for mounting the rotary damper once assembled to a stationary vehicle member such as a panel 23 shown schematically in FIG. 1 by means of suitable fastening screws (not shown) extending through apertures 29. Housing 20 is made of a polymeric material such as a polycarbonate as, for example, LEXAN.

Figure 10:
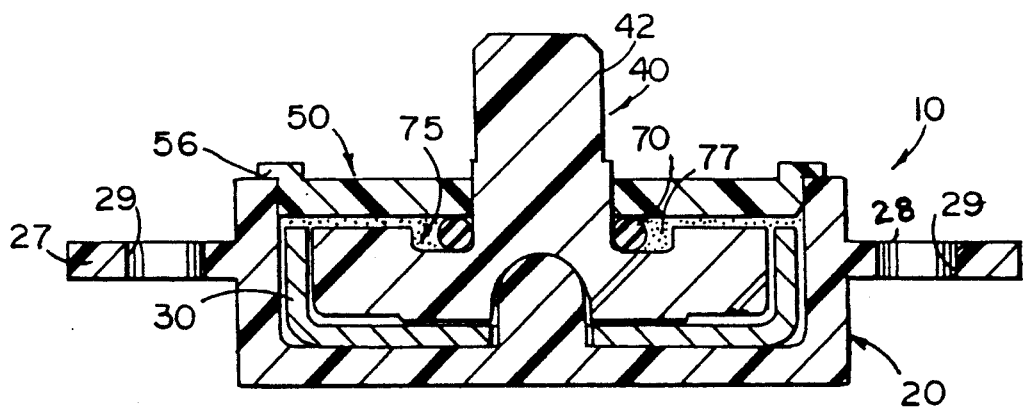
FIG. 10 is a vertical cross-sectional assembled view of the rotary damper embodying the present invention.

Positioned within the cup-shaped recess 25 of housing 20 is a temperature compensating member 30 which, as best seen in FIGS. 4 and 5, is also generally cup-shaped and includes a generally circular floor 31 with an upstanding cylindrical sidewall 34 having a height, as seen in FIG. 10, which is less than that of sidewall 22 of housing 20. Floor 31 of member 30 includes a centrally located aperture 32 which allows member 30 to fit over the stub axle 26 when assembled as seen in FIG. 10. The temperature compensating cup 30 is made of a metal such as #304 stainless steel to provide a coefficient of thermal expansion different than that of the rotor 40 shown in FIG. 1 and in detail in FIGS. 6 and 7.

Rotor 40 includes an axle or stem 42 which extends upwardly and outwardly from the cover 50 of the damper 10 and to which a drive gear 60 is attached in a conventional manner. The rotor includes a generally disc-shaped lower paddle-like end integrally formed with stem 42 and including four outwardly extending equally spaced upper flanges 41, 43, 45 and 47 each having an arcuately curved outer edge 45'. Edges 45' circumscribe a circular arc of about 47.5°. Each of the flanges have flat parallel sidewalls 48 which extend approximately orthogonally to the sides of an adjacent flange section. At the lower portion of each flange there is formed flange sections 51, 53, 55 and 57 respectively having U-shaped notches 58 formed centrally therein. The bottom of the rotor includes a hemispherically formed recess 46 which mateably fits over the dome-shaped stub axle 26 when the damper 10 is assembled as seen in FIG. 10 to provide an aligned rotary interconnection of the rotor 40 to the housing 20 with the temperature compensating cup 30 juxtaposed between the rotor and housing. At the interface of stem 42 and the paddle shaped flanges 41, 43, 45 and 47 of the rotor 40 is an annular slot or recess 49 for receiving a sealing O-ring 70 (FIG. 10) which seals the axle 42 as described below in connection with FIG. 10.

The rotor, like housing 20, is made of a polymeric material and in the preferred embodiment is made of an acetal such as Celcon M-30. The outer diameter of the rotor edges 45', in the preferred embodiment of the invention, was 0.451 inches while the inner diameter of the sidewall 34 of member 30 was 0.468 inches leaving a gap between the facing adjacent surfaces of the members of approximately 0.0085 inches.

Cover 50 is also made of a polymeric material such as polycarbonate to match the material of housing 20 and includes a generally disc-shaped body 52 with a central opening 54 to permit axle 42 to extend outwardly therethrough. At the outer periphery near the top surface of cover 50, there is provided a generally L-shaped lip 56. When assembled, as seen in FIG. 10, the L-shaped lip 56 of cover 50 serves to seal the cover to housing 20 by bonding lip 56 to the mating rim 24 by suitable bonding methods such as either thermal fusion, ultrasonic welding or through fusing adhesive material. The O-ring 70 snugly fits over the circular lower end of axle 42 as seen in FIG. 10 and the inner space 75 of the damper 10 is filled with a highly viscous fluid 77 (FIG. 10) such as silicone.

In a preferred embodiment, Dow Corning #200 silicone fluid having a viscosity of approximately 300 centistokes was employed, This fluid, which is grease-like, is added to substantially fill the interior space 75 of the cup-shaped housing 20 after the insertion of cup 30 and rotor 40 and prior to the installation of the cover. As seen in FIG. 10, the O-ring 70 snugly fits around the axle 42 and engages the lower surface of the cover 50 immediately adjacent opening 54 to prevent the silicone fluid from leaking around stub axle 42. The gap between the outer annular edges of rotor 40 and the inner surface of cup 30 is 0.0085 at 70° F. and becomes slightly smaller with increases in temperature due to the thermal expansion of the stainless steel member 30 with respect to the relatively stable dimensions of the rotor 40. Thus, as the temperature increases, toward a typical maximum of 180 testing limit for the automotive environment, the gap decreases to approximately 50 percent of the gap at 70° F. At the same time the viscosity of fluid 77 decreases substantially tending to allow the rotor 42 to rotate more easily. However, due to the decrease of the gap between the outer periphery of the rotor 40 and the inner diameter of cup-shaped temperature compensating member 30, the sheer forces caused by the laminer flow of the viscous fluid in the gap increases tending to maintain the resistance torque on shaft 42 constant. The reverse takes place as the temperature decreases below 70° F. The gap increases allowing the rotor to move more freely, however, the viscous fluid becomes significantly more viscous which again tends to maintain the resistance torque of the rotary damper constant.

In one embodiment of the invention, the cup 30 was anchored to the floor of housing 20 by providing a pair of apertures and providing posts extending upwardly from the floor 21 of housing 20 into the apertures and heat staking them over to hold the cup in a position against rotation within housing 20. By applying a temperature compensating member having a coefficient of thermal expansion different than that of the rotor, therefore, the torque presented by the damper output shaft 42 can be maintained relatively constant for wide temperature variations. Instead of a cup-shaped member 30, a ring-shaped temperature compensating member also might be employed with a continuous cylindrical ring being positioned between the rotor paddle 40 and housing 20. Also, the housing may integrally include the temperature compensating member or even form the temperature compensating member. These and other modifications to the preferred embodiment of the invention as described herein can be made without departing from the spirit of scope of the invention as defined by the appended claims.

The embodiments of the invention in which an exclusive property or privilege is claimed are defined as follows:

1. A rotary fluid filled damper comprising:
    a housing defining an interior for receiving a rotor therein;
    a rotor having surface means for engaging a viscous fluid;
    means for sealing a viscous fluid within said housing;
    a cup-shaped temperature compensating member positioned in said interior, said temperature compensating member including a cylindrical sidewall defining an interior surface adapted to receive said rotor with said rotor surface means being positioned proximate said sidewall and further including a floor having means for engaging said housing to center said sidewall in said interior, said compensating member being made of a material which has a coefficient of thermal expansion different than that of said rotor to provide a gap between said surface means of said rotor and said temperature compensating member which varies in width with changes in ambient temperature; and
    fluid means for frictionally dampening relative movement between said rotor surface means and said sidewall, said temperature compensating member compensating for viscosity changes in the fluid means as a result of ambient temperature changes, whereby said gap varies as the ambient temperature changes, thus causing the dampening effect on said rotor to remain in a given range despite the effect of the ambient temperature change on the viscosity of the fluid means for dampening.

2. The apparatus as defined in claim 1 wherein said fluid means is a silicone based material.

3. The apparatus as defined in claim 2 wherein said surface means of said rotor includes at least one arcuate section facing the interior surface of said cup-shaped compensating member to define said gap therebetween.

4. The apparatus as defined in claim 1 wherein said rotor is made of a polymeric material.

5. The apparatus as defined in claim 4 wherein said temperature compensating member is made of metal.

6. The apparatus as defined in claim 5 wherein said metal is steel.

7. The apparatus as defined in claim 6 wherein said metal is stainless steel.

8. The apparatus as defined in claim 5 wherein said rotor is made of a polycarbonate.

9. The apparatus as defined in claim 8 wherein said rotor includes a plurality of radially outwardly extending spaced flanges each of which terminate in an arcuate surface is spaced relationship with and facing the interior surface of said temperature compensating member.

10. A rotary fluid filled damper comprising:
a housing defining an interior for receiving a rotor therein;
a rotor having surface means for engaging a viscous fluid, said rotor including an axle extending from said housing to provide a resistance torque;
a cover for said housing, said cover sealingly closing said interior;
a viscous fluid sealed within said housing; and
a cup-shaped temperature compensating member positioned within said housing, said temperature compensating member including a cylindrical sidewall defining an interior surface positioned adjacent said surface means of said rotor, said compensating member being made of a material which has a coefficient of thermal expansion different than that of said rotor to provide a gap between said surface of said rotor and said sidewall of said temperature compensating member which varies with changes in ambient temperature, whereby the viscous fluid dampens relative movement between the compensating member and the rotor, and the gap varies with respect to ambient temperature changes to maintain the dampening effect in a given range despite viscosity changes in the viscous fluid as a result of the ambient temperature changes.

11. The apparatus as defined in claim 10 wherein said surface of said rotor includes at least one arcuate section facing said cup-shaped compensating member to define a gap between said arcuate surface and said compensating member sidewall.

12. The apparatus as defined in claim 11 wherein said rotor is made of a polymeric material.

13. The apparatus as defined in claim 12 wherein said temperature compensating member is made of metal.

14. The apparatus as defined in claim 13 wherein said metal is steel.

15. The apparatus as defined in claim 14 wherein said metal is stainless steel.

16. The apparatus as defined in claim 15 wherein said rotor is made of a polycarbonate.

17. The apparatus as defined in claim 16 wherein said fluid is a silicone based material.

18. The apparatus as defined in claim 17 wherein said rotor includes a plurality of radially outwardly extending spaced flanges each of which terminate in an arcuate surface in spaced relationship with and facing the interior surface of said temperature compensating member.

19. A temperature compensated fluid filled damper comprising:
a first member made of a first material;
a second cup-shaped member made of a second material having a coefficient of thermal expansion different than that of said first material;
a housing defining an interior adapted to receive said first and second members, said housing including a protrusion for positioning said second member and operably movably supporting said first member for movement with respect to said second member; and
a viscous fluid contained in said second member and located between said first and second members, whereby an improved temperature compensating damper is provided that is readily assembled with a minimum of parts.

20. The apparatus as defined in claim 19 wherein said first member has a cylindrical wall and said second member includes an arcuate surface and wherein said mounting means positions said arcuate surface adjacent and facing said cylindrical wall.

21. The apparatus as defined in claim 20 wherein said damper is a rotary damper and said mounting means positions said second member for rotation with respect to said first member.

22. The apparatus as defined in claim 21 wherein said mounting means comprises a housing having an aperture through which said first member at least partially extends.

23. The apparatus as defined in claim 22 including means for sealably holding said viscous fluid in said housing.

24. The apparatus as defined in claim 23 wherein said viscous fluid is a silicone based material and said second member comprises a temperature compensating member.

25. The apparatus as defined in claim 24 wherein said first member defines a rotor which includes at least one arcuate surface facing the interior of said cup-shaped compensating member to define said gap therebetween.

26. The apparatus as defined in claim 25 wherein said rotor is made of a polymeric material.

27. The apparatus as defined in claim 26 wherein said temperature compensating member is made of metal.

28. The apparatus as defined in claim 27 wherein said metal is steel.

29. The apparatus as defined in claim 28 wherein said metal is stainless steel.

30. The apparatus as defined in claim 29 wherein said rotor is made of a polycarbonate.

31. The apparatus as defined in claim 30 wherein said temperature compensating member includes a cylindrical wall defining an interior surface and said rotor includes a plurality of radially outwardly extending spaced flanges each of which terminate in an arcuate surface in spaced relationship with and facing the interior surface of said temperature compensating member.

32. A rotary fluid filled damper comprising:
a cup-shaped housing defining an interior and including a floor;
a cover attached to said housing to close said interior, one of said housing and said cover including an aperture;

a metal cup-shaped temperature compensating member positioned in said interior;

a polymeric rotor rotatably mounted in said interior having surface means for engaging the viscous fluid and having shaft means extending through said aperture for operative connection to a device to be dampened, said surface means being located in said temperature compensating member;

means for dampening relative movement between said surface means and said temperature compensating member including a viscous fluid contained in said interior;

means proximate said aperture for preventing said viscous fluid from escaping from said interior;

said temperature compensating member being made of a material which has a coefficient of thermal expansion different than that of said rotor to provide a gap between said rotor surface means and said temperature compensating member which varies in width with changes in ambient temperature; and said viscous fluid filling said gap and contacting said surface means and said temperature compensating member, whereby the motion of said rotor is dampened within a desired range of resistance to movement despite ambient temperature variation.

* * * * *

UNITED STATES PATENT AND TRADEMARK OFFICE
CERTIFICATE OF CORRECTION

PATENT NO.  : 5,211,267
DATED       : May 18, 1993
INVENTOR(S) : Russell L. Clark It is certified that error appears in the above-indentified patent and that said Letters Patent is hereby corrected as shown below: Title page, item [22]:
    Filing date "March 10, 1992" should be --February 24, 1992--.

*Column 1, line 27;

"tempertures" should be --temperatures--.

Column 2, lines 44 and 45;

"floor 2" should be --floor 21--.

Column 5, line 22, claim 9;

"is spaced" should be --in spaced--.

Signed and Sealed this

Ninth Day of May, 1995

*Attest:*

BRUCE LEHMAN

*Attesting Officer*     *Commissioner of Patents and Trademarks*